(12) United States Patent
Ikegawa et al.

(10) Patent No.: US 6,911,753 B2
(45) Date of Patent: Jun. 28, 2005

(54) GAS DYNAMIC BEARING MOTOR (75) Inventors: Taizo Ikegawa, Kadoma (JP);
Masahiro Jyono, Kadoma (JP);
Yasunori Tokuno, Kadoma (JP);
Takeyoshi Yamamoto, Kadoma (JP);
Satoko Miki, Kadoma (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/797,032

(22) Filed: Mar. 11, 2004

(65) Prior Publication Data

US 2004/0178688 A1 Sep. 16, 2004

(30) Foreign Application Priority Data

Mar. 11, 2003 (JP) ......................................... 2003-064260

(51) Int. Cl.⁷ ................................................. H02K 5/16
(52) U.S. Cl. ......................... 310/90; 310/67 R; 384/107
(58) Field of Search ................................. 310/90, 67 R; 384/100, 107, 111–113; 360/99.08, 98.07

(56) References Cited

U.S. PATENT DOCUMENTS

| | | | | |
|---|---|---|---|---|
| 5,128,571 A | * | 7/1992 | Itsu | 310/67 R |
| 5,533,811 A | * | 7/1996 | Polch et al. | 384/107 |
| 6,005,746 A | * | 12/1999 | Papst | 360/98.07 |
| 6,271,612 B1 | * | 8/2001 | Tanaka et al. | 310/90 |
| 6,608,415 B2 | * | 8/2003 | Komura et al. | 310/90 |

FOREIGN PATENT DOCUMENTS

| | | |
|---|---|---|
| JP | 2800278 | 7/1998 |
| JP | 2000-50568 | 2/2000 |
| JP | 2000-179542 | 6/2000 |

* cited by examiner

*Primary Examiner*—Dang Le
(74) *Attorney, Agent, or Firm*—Parkhurst & Wendel, L.L.P.

(57) ABSTRACT

A gas dynamic bearing motor is provided that is capable of setting a bearing radius to a large value to obtain a sufficient radial stiffness, and preventing lock of the bearing and scattering of wear powder outside the bearing. An annular groove 11 is provided on a lower end surface 87 of a hub 3 to thereby enable a deformation of an inner circumferential surface 82 of the hub 3 when recording disks 9 are loaded on the hub 3 to be suppressed to a small value, thereby enabling partial contact in the radial bearing to be suppressed and lock of the bearing to be prevented. Further, a protrusion 12 is provided on a base 7 in a circumferential direction and fitted in the annular groove 11 to construct a labyrinth seal, thereby enabling scattering of wear powder generated on bearing surfaces outside the bearing to be prevented.

11 Claims, 9 Drawing Sheets

GAS DYNAMIC BEARING MOTOR

The present invention relates to a gas dynamic bearing used in a small spindle motor of a hard disk drive or the like.

BACKGROUND ART

A high precision and high speed rotation have increasingly been requested, heretofore, in a spindle motor used in a hard disk drive along with realization of a higher density and higher speed data transmission in the hard disk drive. In recent years, a dynamic pressure oil bearing motor has been employed as a technique of serving for such a request. There has also been studied a gas dynamic bearing motor capable of a high speed rotation without scattering of oil or degradation of oil.

A gas has a viscosity lower than oil and a compressible fluid; therefore, a gas dynamic bearing has a low load capacity per a unit area of the bearing, which inevitably requires a larger scale as compared with a dynamic oil bearing. If a gas dynamic bearing was constructed within a small motor used for a spindle of a hard disk drive, it would be hard to obtain a sufficient bearing stiffness. Hence, since a diameter of a radial bearing necessary to be the largest possible value, various constructions have been investigated in order to enhance a bearing stiffness.

Figure 17:
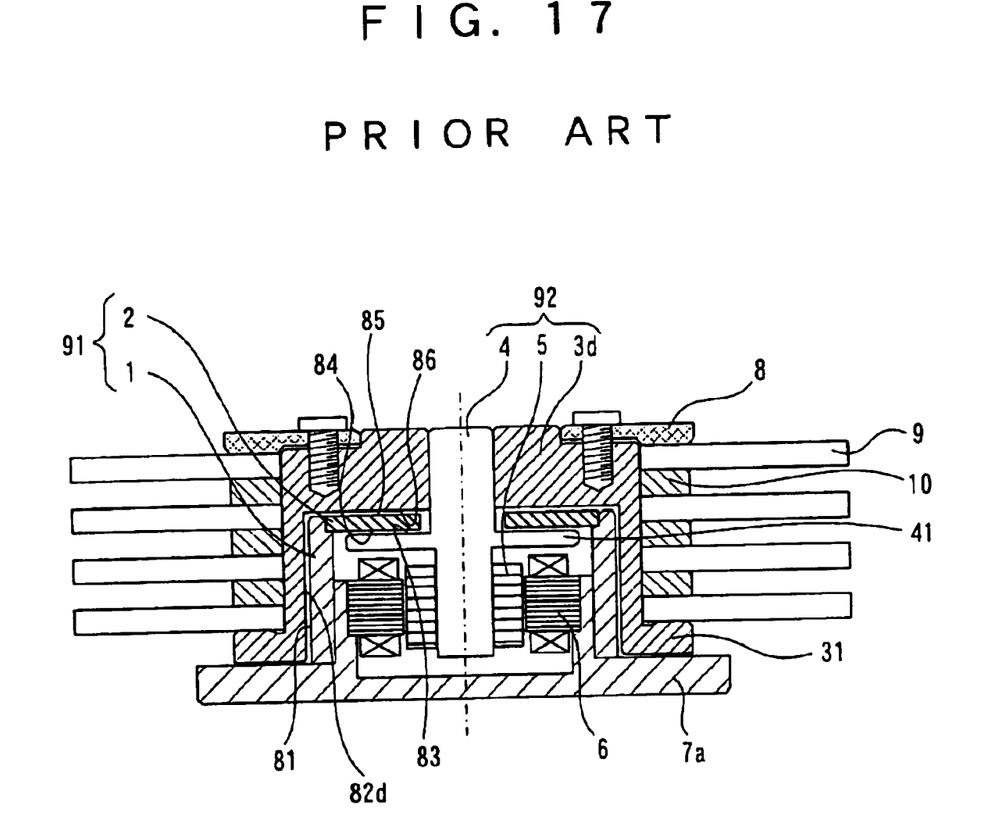
FIG. 17 is a sectional view of a conventional gas dynamic bearing.

In FIG. 17, there is shown a sectional view of an example of a conventional gas dynamic bearing. A stationary shaft 91 is constructed of a cylindrical shaft 1 and a ring-shaped thrust plate 2 fixed on the upper end of the shaft 1, wherein the lower end of the stationary shaft 91 is fixed to a base 7a. A lidded cylindrical hub 3d is fitted with an outer circumferential surface 81 of the shaft 1 and an upper surface 85 of the thrust plate 2 so as to surround them with a predetermined clearance interposed therebetween. Inserted and fixed in a central hole of the hub 3d is a pin 4 with a magnet 5 fixed at the lower portion thereof and a flange 41 in the middle portion thereof, and a rotor assembly 92 is constructed of the hub 3d, the pin 4 and the magnet 5 combined. A flange-shaped disk receiving portion 31d extending outwardly in a radial direction is provided at the lower end of the hub 3d, on which recording disks 9 and spacers 10 are loaded and fixed by screwing a clamp 8 at the top thereof into the hub 3d.

Pressure generating grooves (not shown) are provided on the outer circumferential surface 81 of the shaft 1 to thereby form a radial bearing between an inner circumferential 82d of the hub 3d and the outer circumferential surface 81. Pressure generating grooves (not shown) are provided on the upper surface 85 and lower surface 84 of the thrust plate 2, a first thrust bearing is constructed of the upper surface 85 of the thrust plate 2 and an upper surface 86 inside the hub 3d and a second thrust bearing is constructed of the lower surface 84 of the thrust plate 2 and the upper surface 83 of the flange 41 of the pin 4.

A stator core assembly 6 is fixed to the base 7a opposite the magnet 5 and a current is supplied through the stator core assembly 6 to thereby rotate the recording disks 9 together with the rotor assembly 92. With rotation of the rotor assembly 92, dynamic pressures are generated in the radial bearing, the first and second thrust bearings, which makes it possible to hold the rotor assembly 92 in a non-contact state.

With a construction similar to the above case, a technique has been adopted in which provided in a radial bearing are pressure generating grooves forcibly sending a gas in a thrust bearing direction, while provided in a thrust bearing are pressure generating grooves forcibly sending the gas in an outer circumference direction, so as to obtain a sufficient thrust load capacity (see JP 2002-238212 A, for example).

A technique has been adopted in which a thrust dynamic pressure oil bearing is provided inside a radial dynamic gas bearing to thereby make the motor compact and set a diameter of the radial bearing large, thereby enabling a sufficient radial bearing stiffness to be obtained (see JP 2800278 B and JP 2000-179542 A, for example).

A technique has been adopted in which a stationary shaft is constructed so as to be separated into a first portion on the base side and a second portion on the distal end side to thereby set the diameter of a radial bearing to the largest possible value, thereby enabling a sufficient radial bearing stiffness to be obtained (see JP 2000-50568 A, for example).

In a gas dynamic bearing motor as in the conventional examples described above, a diameter of a radial bearing has been set to the largest possible value in order to obtain a sufficient radial bearing stiffness; therefore, there has been a trend toward a smaller thickness of the hub 3d, which is a difference in radius between the inner circumferential surface and outer circumferential surface of the hub 3d. Consequently, a large force acts on a disk receiving portion when the recording disks 9 are loaded on the hub 3d and fixed with the clamp 8; therefore, the hub 3d deforms so that the lower end portion of the inner circumferential surface of the hub 3d is bent inwardly.

In a conventional gas dynamic bearing motor, machining of parts has been made so that the outer circumferential surface of the shaft 1 and the inner circumferential surface of the hub 3d face each other with a predetermined clearance interposed therebetween in the state where no recording disk 9 is loaded on the hub 3d. Therefore, the clearance between the outer circumferential surface of the shaft 1 and the inner circumferential surface of the hub 3d becomes narrower in the lower end portion of the radial bearing when the recording disks 9 are loaded on the hub 3d for assembly, resulting in occurrence of partial contact, generation of abrasive wear and lock of the bearing.

Wear powder generated by friction on bearing surfaces scatters outside the motor through a clearance between the base and the lower end surface of the hub to contaminate the interior of the hard disk drive.

DISCLOSURE OF THE INVENTION

The present invention solves the problems and it is an object of the present invention to provide a gas dynamic bearing motor capable of: restricting deformation of an inner circumferential surface of a rotor assembly on which a recording disk is loaded to a small value even in a case where a diameter of a radial bearing is set to a large value in order to obtain a sufficient radial bearing stiffness to thereby thin a thickness of the rotor assembly; suppressing partial contact, which has occurred conventionally in the lower end portion of an inner circumferential surface of the rotor assembly to thereby prevent abrasion wear and lock of the bearing; and further, of preventing wear powder generated by friction between bearing surfaces from scattering outside a motor through a clearance between a base and a lower end surface of a hub.

In order to solve the problems, a gas dynamic bearing motor of the present invention includes a stationary shaft having a cylindrical surface and a rotor assembly having a cylindrical portion facing the stationary shaft with a predetermined clearance interposed therebetween in a radial direction of the stationary shaft and freely rotatably fitted with the stationary shaft, wherein a pressure generating groove is formed on at least one of an outer circumferential surface of the stationary shaft and an inner circumferential surface of the rotor assembly to thereby construct a radial bearing, a flange shaped disk receiving portion extending outwardly in a radial direction is provided at the lower end of the rotor assembly, a predetermined number of recording disks are loaded on the disk receiving portion, a clamp is disposed on the uppermost portion and fixed to the rotor assembly to squeeze the recording disks between the disk receiving portion and the clamp with a predetermined force for fixation of the recording disks, and then, the rotor assembly is rotated by a driving motor to hold the rotor assembly and the recording disks in a non-contact manner with the stationary shaft with the action of a dynamic pressure of a gas residing in a clearance between the stationary shaft and the rotor assembly. The gas dynamic bearing motor is characterized in that an annular groove is provided on an end surface of the disk receiving portion side of the rotor assembly coaxially with the stationary shaft.

According to the present invention, since the annular groove is provided on the end surface of the disk receiving portion side of the rotor assembly coaxially with the stationary shaft even in a case where a diameter of a radial bearing is set to a large value in order to obtain a sufficient radial bearing stiffness to thereby thin a thickness of the rotor assembly, a part of a deformation amount of the rotor assembly toward the inner circumferential surface side thereof generated when the clamp is fixed to the rotor assembly is absorbed by the annular groove and, thereby, deformation of the inner circumferential surface of the rotor assembly when the recording disks are loaded on the rotary assembly can be restricted to a small value; therefore, enabling partial contact, which has occurred conventionally, in the lower end portion of the inner circumferential surface of the rotor assembly to be suppressed and, in turn, abrasive wear and lock of the bearing to be prevented.

The gas dynamic bearing motor of the present invention is also characterized in that an outer diameter of the stationary shaft is constant in an axial direction thereof, while a diameter of the inner circumferential surface of the rotor assembly changes in an axial direction thereof when no recording disk is loaded on the disk receiving portion so that a clearance between the outer circumferential surface of the stationary shaft and the inner circumferential surface of the rotor assembly is almost constant in the axial directions thereof when the recording disks are loaded on the disk receiving portion.

According to the present invention, even in a case where a diameter of the radial bearing is set to a large value in order to obtain a sufficient radial bearing stiffness to thereby thin a thickness of the rotor assembly, a clearance between the outer circumferential surface of the stationary shaft and the inner circumferential surface of the rotor assembly is almost constant in the axial directions thereof after deformation of the inner circumferential surface of the rotor assembly caused by loading recording disks on the rotor assembly; therefore, enabling partial contact, which has occurred conventionally, in the lower end portion of the inner circumferential surface of the rotor assembly to be suppressed and, in turn, abrasive wear and lock of the bearing to be prevented.

The gas dynamic bearing motor of the present invention is also characterized in that an inner diameter of the rotor assembly is constant in the axial direction thereof, while a diameter of the outer circumferential surface of the stationary shaft changes in the axial direction thereof so that a clearance between the outer circumferential surface of the stationary shaft and the inner circumferential surface of the rotor assembly is almost constant in the axial directions thereof when the recording disks are loaded on the disk receiving portion.

According to the present invention, even in a case where a diameter of the radial bearing is set to a large value in order to obtain a sufficient bearing stiffness to thereby thin a thickness of the rotor assembly, a clearance between the outer circumferential surface of the stationary shaft and the inner circumferential surface of the rotor assembly is almost constant in the axial directions thereof after deformation of the inner circumferential surface of the rotor assembly when recording disks are loaded on the rotor assembly; therefore, enabling partial contact, which has occurred conventionally, in the lower end portion of the inner circumferential surface of the rotor assembly to be suppressed and, in turn, abrasive wear and lock of the bearing to be prevented.

The gas dynamic bearing motor of the present invention is also characterized in that a protrusion is provided on the base in a circumferential direction thereof and fitted in the annular groove provided on the rotor assembly with a predetermined clearance interposed therebetween to thereby construct a labyrinth seal.

According to the present invention, wear powder generated by friction between bearing surfaces is prevented from being scattered outside the motor through a clearance between the base and the lower end surface of the hub by a cooperative action of the annular groove provided on the rotor assembly and the protrusion of the base.

EMBODIMENTS (Embodiment 1)

Figure 1:
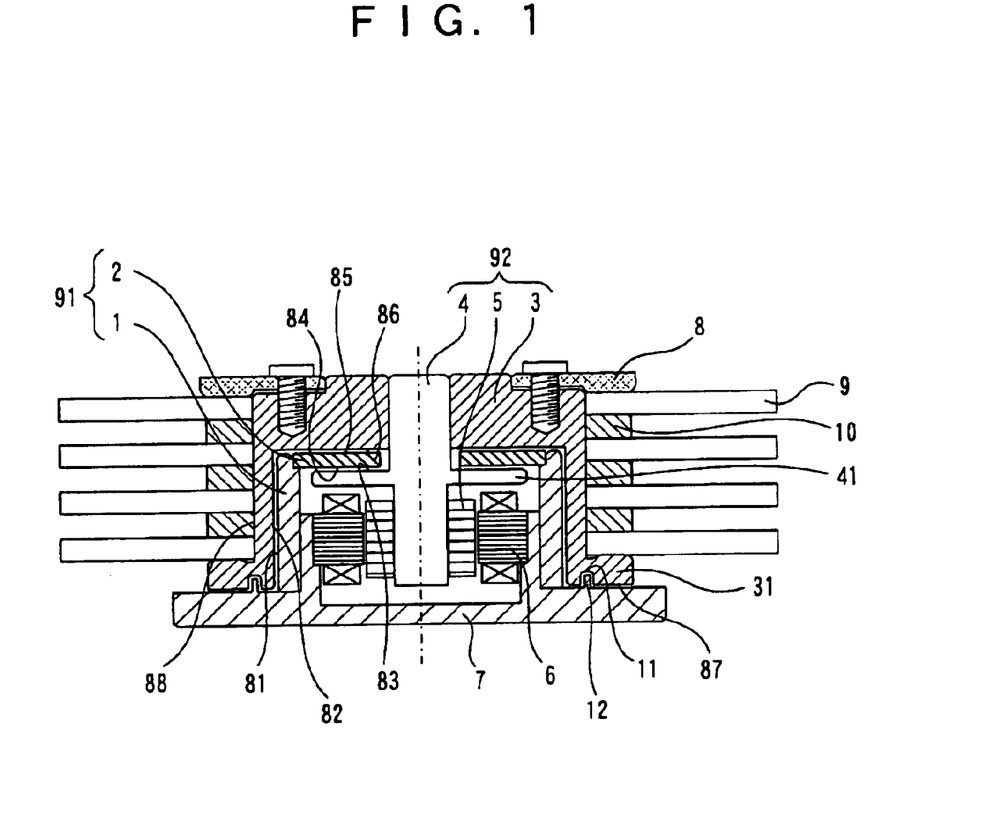
FIG. 1. is a sectional view of a gas dynamic bearing in Embodiment 1 of the present invention.
Figure 3A:
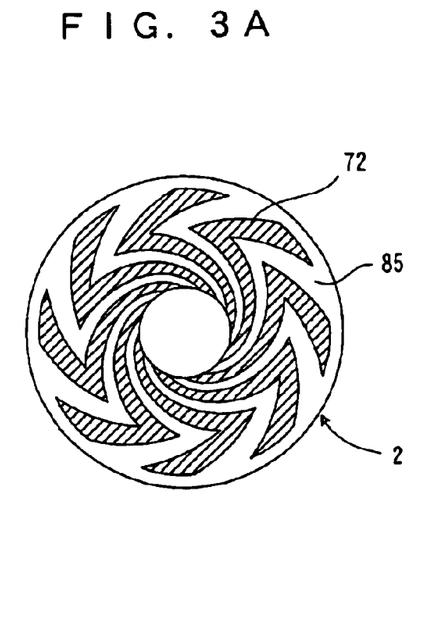
FIG. 3A is a upper surface view of a thrust plate of the gas dynamic bearing.
Figure 3B:
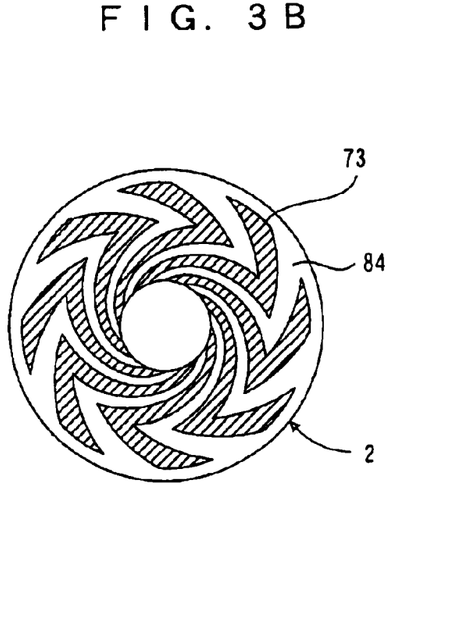
FIG. 3B is a lover surface view of the thrust plate of the gas dynamic bearing.
Figure 4:
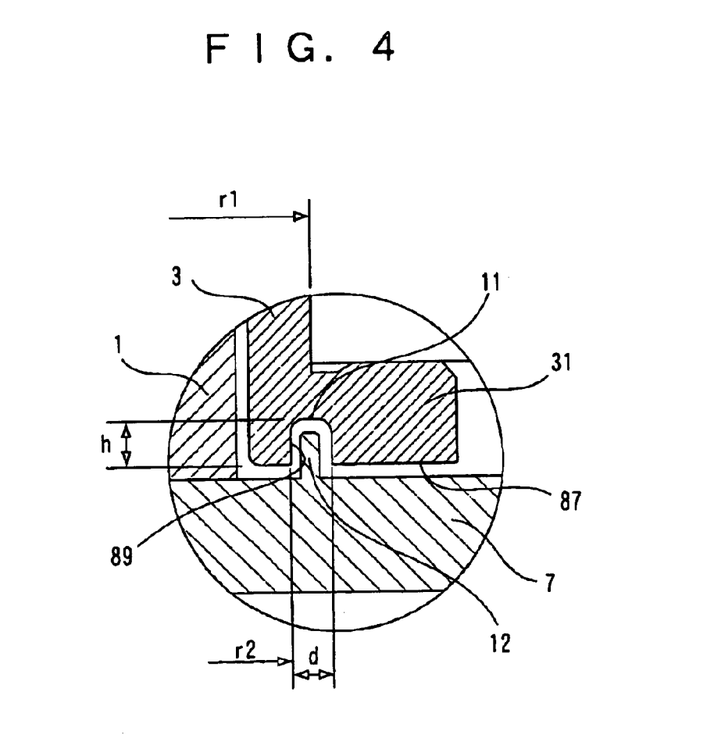
FIG. 4 is an enlarged sectional view of a part in the vicinity of a disk receiving portion of the gas dynamic bearing.

Description will be given of a first embodiment of the present invention using FIGS. 1 to 7 below. FIG. 1 is a sectional view of a gas dynamic bearing of the present invention. FIG. 4 shows an enlarged sectional view of a part in the vicinity of a disk receiving portion of the gas dynamic bearing.

As shown in FIG. 1, a stationary shaft 91 is constructed of a cylindrical shaft 1 and a ring-shaped thrust plate 2 fixed at the upper end of the shaft 1, wherein the lower end of the stationary shaft 91 is fixed to a base 7. A lidded cylindrical hub 3d is fitted with an outer circumferential surface 81 of the shaft 1 and an upper surface 85 of the thrust plate 2 so as to surround them with a predetermined clearance interposed therebetween. Inserted and fixed in a central hole of the hub 3 is a pin 4 with a magnet 5 fixed at the lower portion thereof and a flange 41 in the middle portion thereof, and a rotor assembly 92 is constructed of the hub 3, the pin 4 and the magnet 5 combined.

Figure 2:
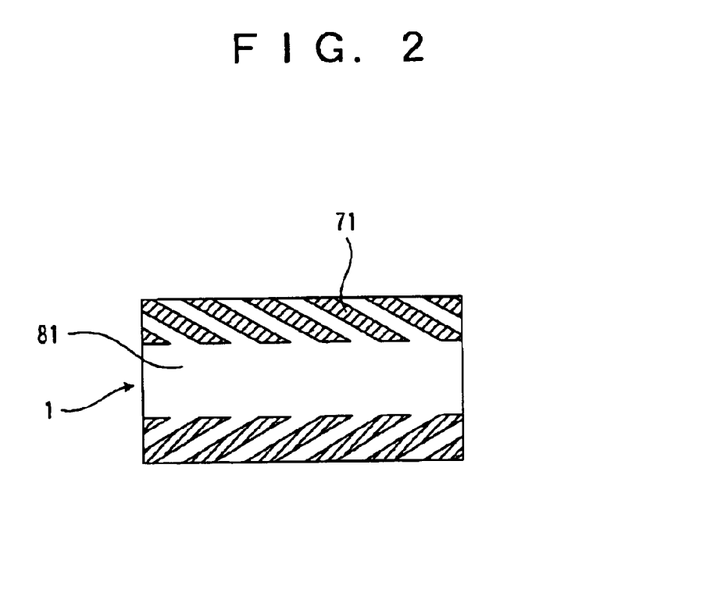
FIG. 2 is a side view of a shaft of the gas dynamic bearing.

Pressure generating grooves 71 shown in FIG. 2 are provided on the outer circumferential surface 81 of the shaft 1 and a radial bearing is constructed of the outer circumferential surface 81 of the shaft 1 and the inner circumferential surface 82 of the hub 3. Pressure generating grooves 72 and 73 shown in FIGS. 3(a) and 3(b) are provided on the upper surface 85 and lower surface 84 of the thrust plate 2, a first thrust bearing is constructed of the upper surface 85 of the thrust plate 2 and an upper surface 86 inside the hub 3 and a second thrust bearing is constructed of the lower surface 84 of the thrust plate 2 and the upper surface 83 of the flange 41 of the pin 4. A wear resisting film is coated on the outer circumferential surface 81 of the shaft 1 and the upper surface 85 and lower surface 84 of the thrust plate 2, thereby reducing a friction coefficient and preventing wear.

A stator core assembly 6 is fixed to the base 7, opposite the magnet 5 and a current is supplied through the stator core assembly 6 to there by rotate the rotor assembly 92. With rotation of the rotor assembly 92, dynamic pressures of air residing in clearances of the radial bearing, the first and second thrust bearings are generated therein, which makes it possible to hold the rotor assembly 92 in a non-contact state.

Provided at the lower end of the hub 3 is a flange-shaped disk receiving portion 31 extending outwardly in a radial direction and loaded on the disk receiving portion 31 are recording disks 9 and spacers 10 and, by screwing a clamp 8 into the hub 3, the recording disks 9 and spacers 10 are fixed by a clamping force of the order of 100 N. Note that means for fixing the clamp 8 to the hub 3 may be any of shrink fit and welding without specifically limiting to the screwing.

In a case where a diameter of a radial bearing is set to a large value in order to obtain a sufficient radial bearing stiffness to thereby thin a thickness of the hub 3 to a value thinner than 3 mm, a deformation of the inner circumferential surface 82 of the hub 3 increases when the recording disks 9 are fixed on the disk receiving portion 31 by the clamp 8. Therefore, an annular groove 11 is provided on the lower end surface 87 of the disk receiving portion 31 of the hub 3 in a circumferential direction thereof to thereby, with the annular groove 11, absorb a part of a deformation amount of the rotor assembly 92 toward the inner circumferential surface 82 occurring when the clamp 8 is fixed to the rotor assembly 92, thereby enabling deformation of the inner circumferential surface 82 of the hub 3 to be suppressed to a small value. Furthermore, with the annular groove 11 provided, partial contact, which has occurred conventionally, in the lower end portion of the hub 3 is suppressed, thereby enabling abrasive wear and lock of the bearing to be prevented. If a length of the inner circumferential surface 82 of the hub 3 in the axial direction thereof is longer than 20 mm, or if a deformation of the lower end portion of the inner circumferential surface 82 is 5 $\mu$m or more in a case where no annular groove 11 of the hub 3 is provided, a possibility arises that a deformation of the inner circumferential surface 82 of the hub 3 cannot be sufficiently restricted to a small value even in a case where the annular groove 11 is provided. Since no annular groove 11 with sufficiently large dimensions can be provided with a thin thickness of the disk receiving portion 31 in the axial direction thereof, a thickness of the disk receiving portion 31 in the axial direction of the hub 3 is preferably 1.5 mm or more.

A protrusion 12, facing the annular groove 11, is provided on the base 7 in a circumferential direction thereof and fitted in the annular groove 11 with a clearance in the range from tens of $\mu$m to hundreds of $\mu$m interposed therebetween to construct a labyrinth seal, thereby preventing scattering wear powder generated on the bearing surfaces outside the bearing. Note that a sectional shape of the annular groove 11 is not limited to a rectangle but may be a triangle or the like.

Detailed description will be given of the action of the annular groove 11 using FIGS. 4 to 7. The hub 3 is made of stainless steel and has an outer diameter of 25 mm and a length, in the axial direction of the hub 3, of the inner circumferential surface 82 of 9.5 mm, and a thickness, in the axial direction thereof, of the disk receiving portion 31 is machined to a value of 2.5 mm. In order that a diameter of the shaft 1 is set to the largest possible value to thereby obtain a sufficient radial bearing stiffness, a thickness of the hub 3, which is a difference in radius between the inner and outer circumferential surfaces 82 and 88 of the hub 3, is machined to a value of 1 mm. Provided is the annular groove 11 having a difference r1−r2 of 0.25 mm, when, as shown in FIG. 4, an outer radius of the hub 3 is r1 and a radius of the inner wall 89 of the annular groove 11 in the radius direction thereof is r2; a width d of 0.5 mm and a depth h of 1.5 mm.

Figure 5:
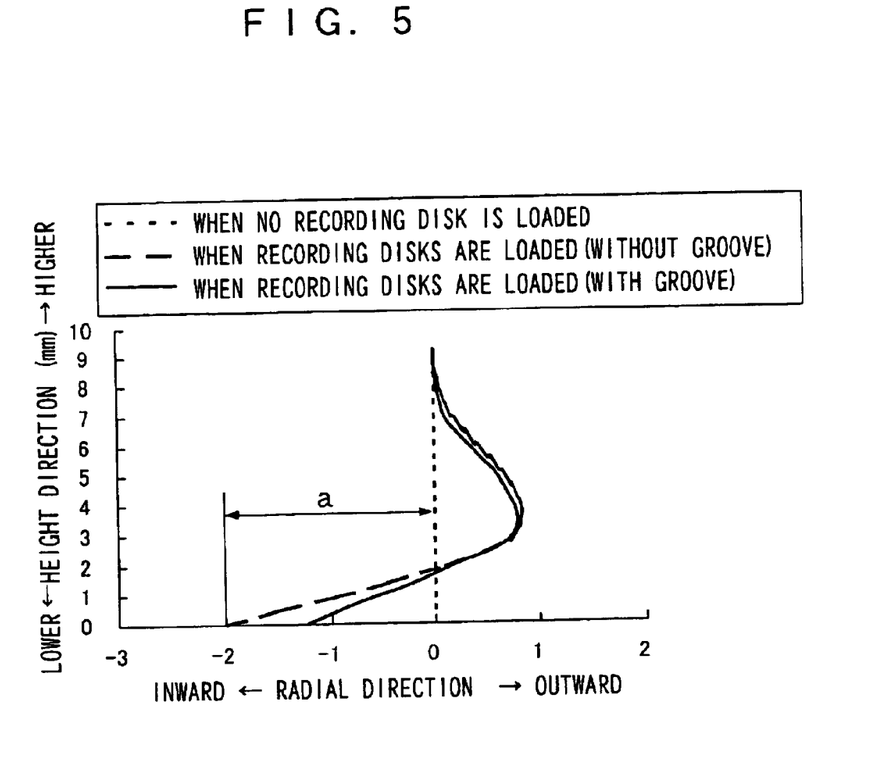
FIG. 5 is a graph showing sectional shapes of the inner circumferential surface of a hub when recording disks are loaded and when no recording disk is loaded in the gas dynamic bearing.

In FIG. 5, there are shown results of measurement of sectional shapes of the inner circumferential surfaces 82 of the hub 3 when no recording disk 9 is loaded and when the recording disks 9 are loaded on the motor with a construction as described above, and when the recording disks 9 are loaded on the motor without the annular groove 11. With the annular groove 11 provided, as shown in FIG. 5, a deformation amount of the inner circumferential surface 82 of the hub 3 decreases with the results that a deformation amount a of the lower end portion of the inner circumferential surface 82 of the hub 3, inwardly in a radial direction thereof, decreases from 2 $\mu$m to 1.2 $\mu$m.

As a gas dynamic bearing motor for a hard disk drive, a clearance between the outer circumferential surface 81 of the shaft 1 and the inner circumferential surface 82 of the hub 3 is preferably set on the order of a value in the range from 3 μm to 5 μm, and it is further required that in order to prevent abrasive wear due to partial contact in the lower end portion and lock of the bearing, which have occurred conventionally, a deformation of the lover end portion of the inner circumferential surface 82 of the hub 3, inwardly in the radial direction thereof, is at most equal to or less than one half of the clearance between the outer circumferential surface of the shaft 1 and the inner circumferential surface 82 of the hub 3 in consideration of the machining precision of the shaft 1 or the hub 3. In the motor shown in FIG. 1, since a clearance between the outer circumferential surface 81 of the shaft 1 and the inner circumferential surface 82 of the hub 3 is set to 3 μm, a deformation amount of the lower end portion of the inner circumferential surface 82 of the hub 3, inwardly in a radial direction thereof, is preferably set to a value of about 1.5 μm or less.

Figure 6:
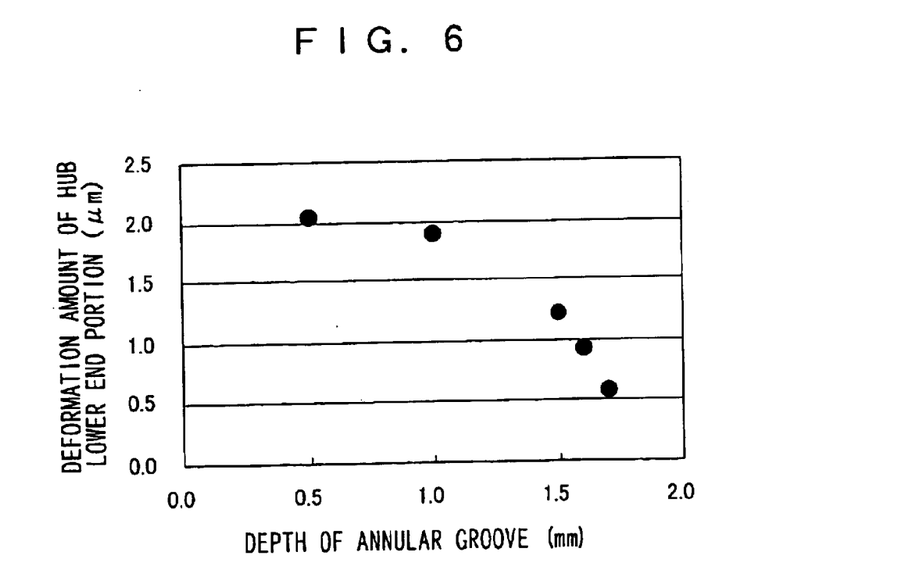
FIG. 6 is a graph showing a relationship between a depth of an annular groove and a deformation amount of a lower end portion of a hub in the gas dynamic bearing.

In FIG. 6, there is shown results of measurement on a relationship between a depth h of an annular groove 11 and a deformation amount of the lower end portion of the inner circumferential surface 82 of the hub 3, inwardly in a radial direction thereof. As is clear from FIG. 6, a depth h of the annular groove 11 has only to be 1.3 mm or more in order to restrict a deformation amount of the lower end portion of the hub 3 to a value of about 1.5 μm or less. However, since there are a difference in clearance between the outer circumferential surface 81 of the shaft 1 and the inner circumferential surface 82 of the hub 3 according to a motor and a change in deformation amount due to a shape of the annular groove 11, a material or a shape of the hub 3 or the like, a depth h of the annular groove 11 in the present invention has only to be 1 mm or more taking the difference and change into consideration.

Figure 7:
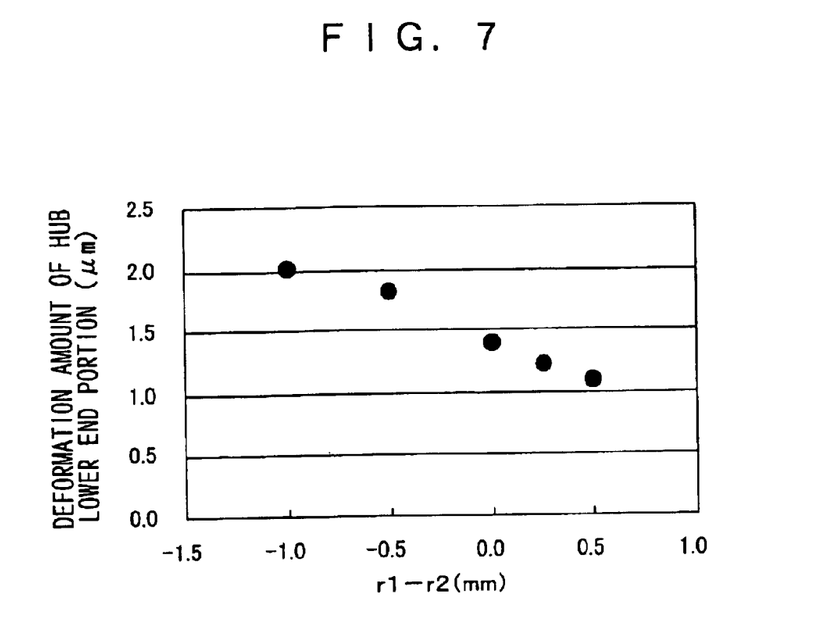
FIG. 7 is a graph showing a relationship between a difference between an outer radius r1 of the hub and a radius r2 of an inner wall of a groove inwardly in a radial direction thereof (r1−r2), and a deformation amount of a lower end portion of the hub in the gas dynamic bearing.

In FIG. 7, there is shown results of measurement of a relationship between a difference between an outer radius r1 of the hub 3 and a radius r2 of the inner wall 89 of the annular groove 11 in a radial direction thereof: (r1−r2) and a deformation amount of the lower end portion of the inner circumferential surface 82 of the hub 3 inwardly in a radius direction thereof. As is clear from FIG. 7, the difference has only to be r1−r2≧−0.1 mm in order to obtain a deformation amount of the lower end portion of the hub 3 at a value of about 1.5 μm or less. However, since there are a difference in clearance between the outer circumferential surface 81 of the shaft 1 and the inner circumferential surface 82 of the hub 3 according to a motor and a change in deformation amount due to a shape of the annular groove 11, a material or a shape of the hub 3 or the like, the difference in the present invention has only to be r1−r2≧−1.0 mm taking the difference and change into consideration.

While a depth d of the annular groove 11 does not greatly affect a deformation amount of the lower end portion of the hub 3, a stiffness of the disk receiving portion 31 is enhanced with a smaller depth adopted, thereby enabling the deformation amount of the lower end potion of the hub 3 to be reduced. The minimum value of a depth d is almost determined by a processing method and preferably 1.5 mm or less.

(Embodiment 2)

In FIGS. 8 to 13, there are shown sectional views of examples of a second embodiment of the present invention. Note that the same marks are attached to the same constituents of the construction of a dynamic gas bearing motor as those in the above embodiment; therefore, description thereof will not be repeated. Note that the shapes and dimensions in the gas dynamic bearing motor in this embodiment are almost the same as in the gas dynamic bearing motor in Embodiment 1.

Figure 8:
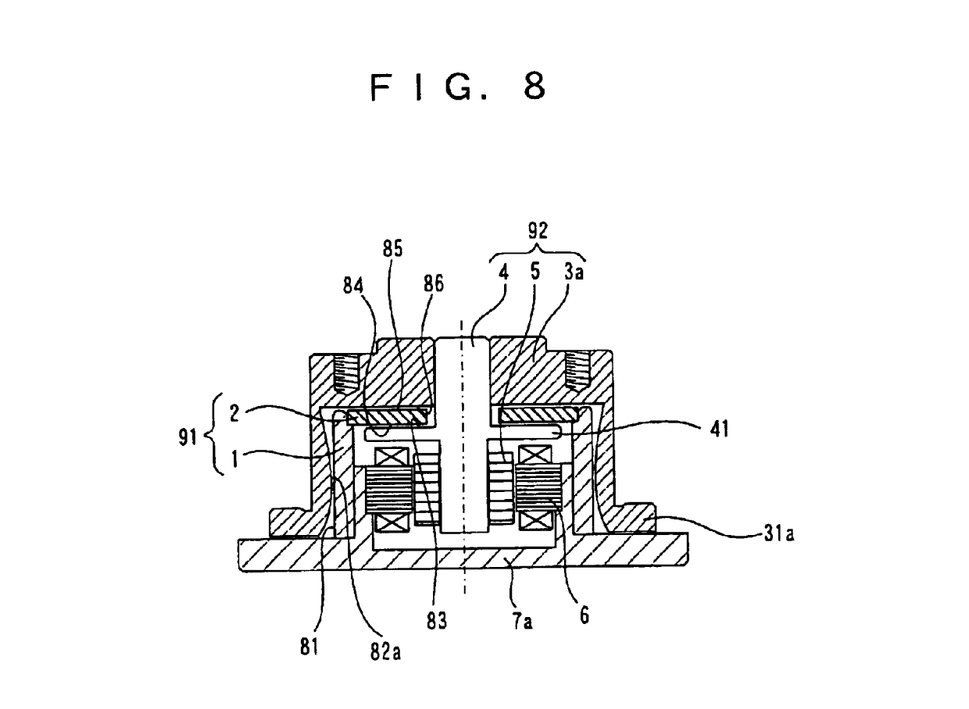
FIG. 8 is a sectional view of a gas dynamic bearing in Embodiment 2 of the present invention.

In a state where a diameter of the outer circumferential surface 81 of the shaft 1 is constant in the axial direction thereof and no recording disk is loaded, a diameter of the inner circumferential surface 82a of the hub 3a, as shown in FIG. 8, takes the minimum value in the middle in the axial direction thereof and changes smoothly in the axial direction with the maximum value at the lower end.

Figure 11:
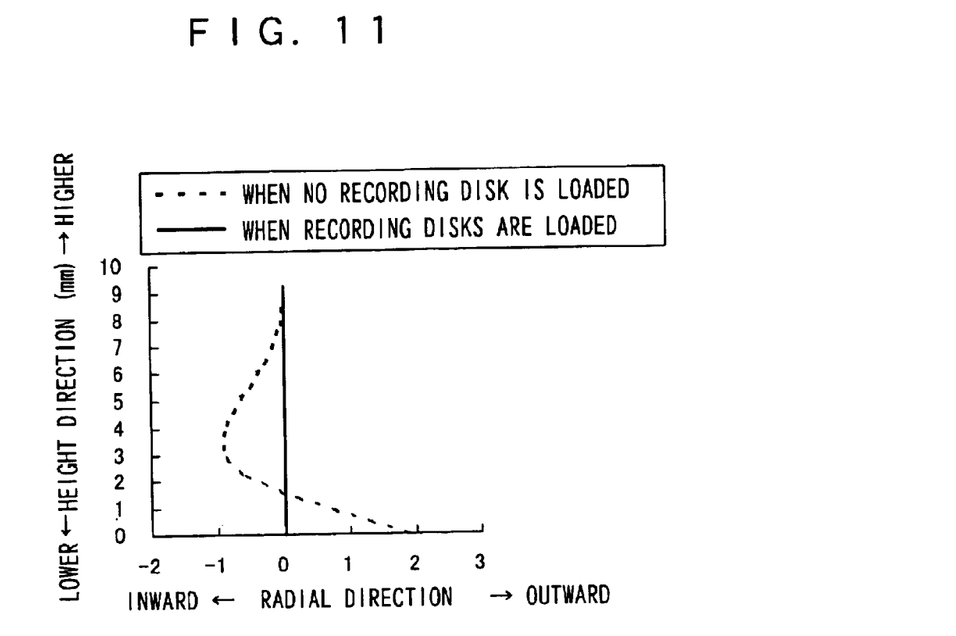
FIG. 11 is a graph showing sectional shapes of an inner circumferential surface of a hub when recording disks are loaded and when no recording disk is loaded in the gas dynamic bearing shown in FIG. 8.

In FIG. 11, there is shown results of measurement on sectional shapes of the inner circumferential surface 82a of the hub 3a when recording disks 9 are loaded and when no recording disk 9 is loaded. As is clear from FIG. 11, it is found that in a case where a radius of the inner circumferential surface 82a of the hub 3a takes a value of −1 μm in the middle when the recording disks 9 are loaded and a value of +2 mm at the lower end when no recording 9 disk is loaded, the radius takes values so that a sectional shape of the inner circumferential surface 82a of the hub 3a assumes almost linear when the recording disks 9 are loaded. Therefore, even in a case where a thickness of the hub 3a is thin to greatly deform the inner circumferential surface 82a of the hub 3a when the recording disks 9 are loaded, a clearance between the outer circumferential surface 81 of the shaft 1 and the inner circumferential surface 82a of the hub 3a, by the action of the present invention, can be restricted at an almost constant value; thereby enabling partial contact, which has occurred conventionally, in the lower end portion of the hub 3a to be suppressed and, in turn, abrasive wear and lock of the bearing to be prevented.

Figure 9:
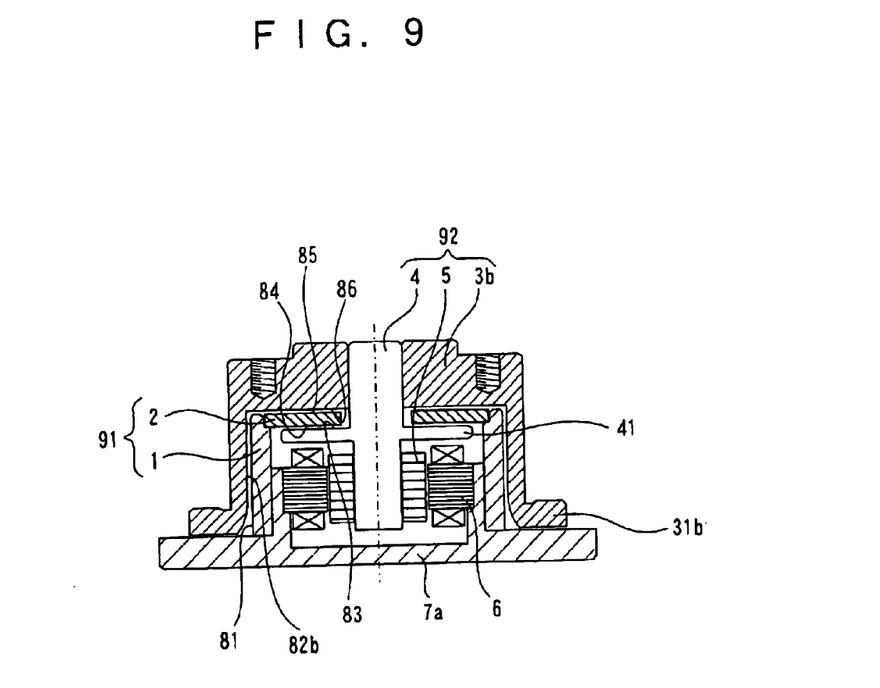
FIG. 9 is a sectional view of another gas dynamic bearing in Embodiment 2 of the present invention.
Figure 10:
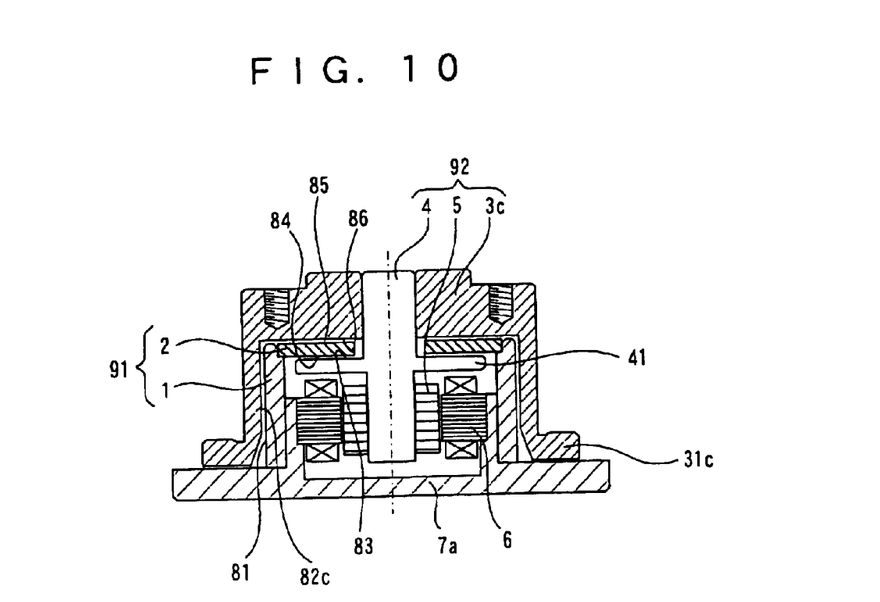
FIG. 10 is a sectional view of still another gas dynamic bearing in Embodiment 2 of the present invention.

In a case where a deformation amount of the inner circumferential surface 82a of the hub 3a when the recording disks 9 are loaded is not so much large, a similar action can be ensured if a diameter of the inner circumferential surface 82b of the hub 3b, as shown in FIG. 9, takes a constant value over the upper half from the middle, while diameters thereof assume a curved shape increasing gradually toward the lower end from the middle in the axial direction thereof or if diameters of the inner circumferential surface 82c of the hub 3c, as shown in FIG. 10, assume a tapered shape increasing toward the lower end from the middle in the axial direction thereof. Furthermore, such simple shapes make machining and inspection easier.

Figure 12:
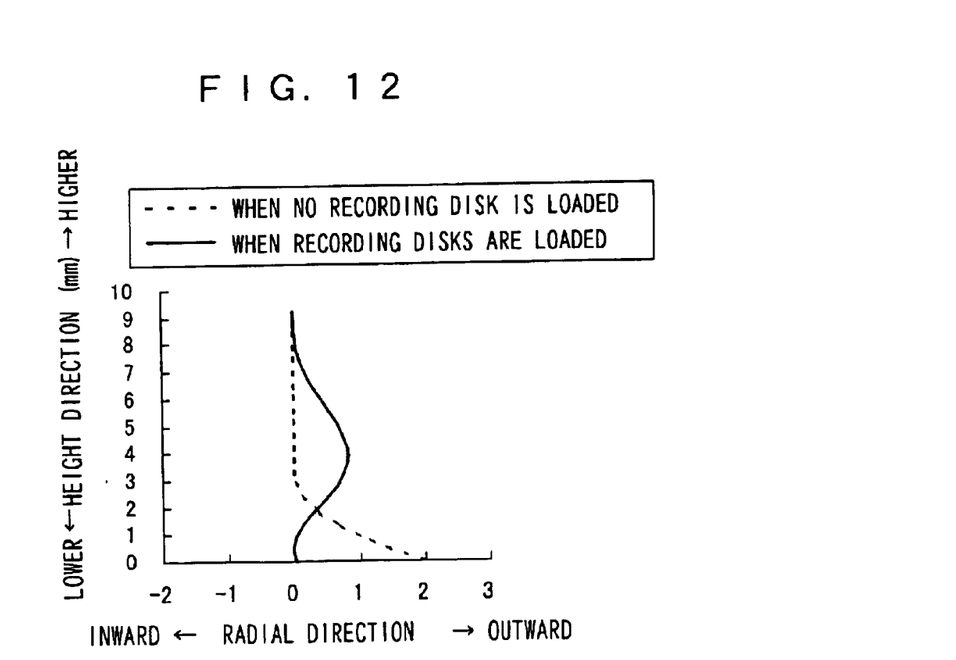
FIG. 12 is a graph showing sectional shapes of an inner circumferential surface of a hub when recording disks are loaded and when no recording disk is loaded in the gas dynamic bearing shown in FIG. 9.
Figure 13:
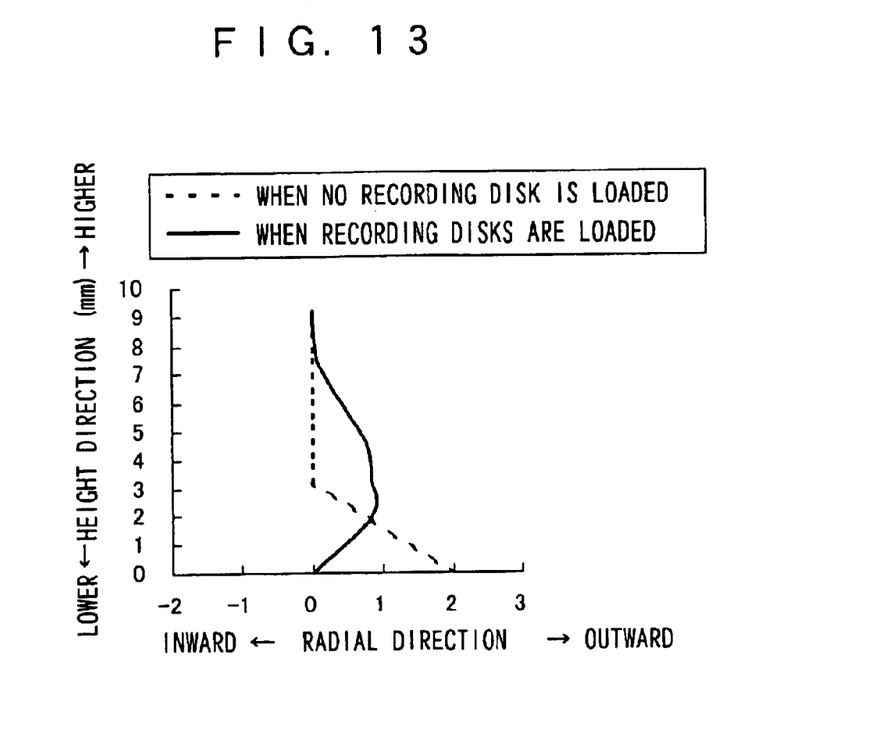
FIG. 13 is a graph showing sectional shapes of an inner circumferential surface of a hub when recording disks are loaded and when no recording disk is loaded in the gas dynamic bearing shown in FIG. 10.

In FIG. 12, there are shown results of measurement on sectional shapes of the inner circumferential surface 82b of the hub 3b when no recording disk 9 is loaded and when the recording disks 9 are loaded in a case where the inner circumferential surface 82b of the hub 3b is in a curved shape. In FIG. 13, there is shown results of measurement on sectional shapes of the inner circumferential surface 82c of the hub 3c when no recording disk 9 is loaded and when the recording disks 9 are loaded in a case where the inner circumferential surface 82c of the hub 3c is of a tapered shape.

As shown in FIGS. 12 and 13, in both of the shapes, in the state where the recording disks 9 are loaded, it is possible to set a difference between the maximum value and the minimum value of a clearance between the outer circumferential surface 81 of the shaft 1 and the inner circumferential surface 82b or 82c of the hub 3b or 3c to a value of 1.5 μm or less, thereby enabling partial contact, which has occurred conventionally, in the lower end portion of the hub 3b or 3c to be suppressed and, in turn, abrasive wear and lock of the bearing to be prevented. Note that in the present invention, a difference between the maximum value and minimum value of a clearance between the outer circumferential surface 81 of the shaft 1 and the inner circumferential surface 82*b* or 82*c* of the hub 3*b* or 3*c* has only to be one half of the clearance or less.

(Embodiment 3)

Figure 14:
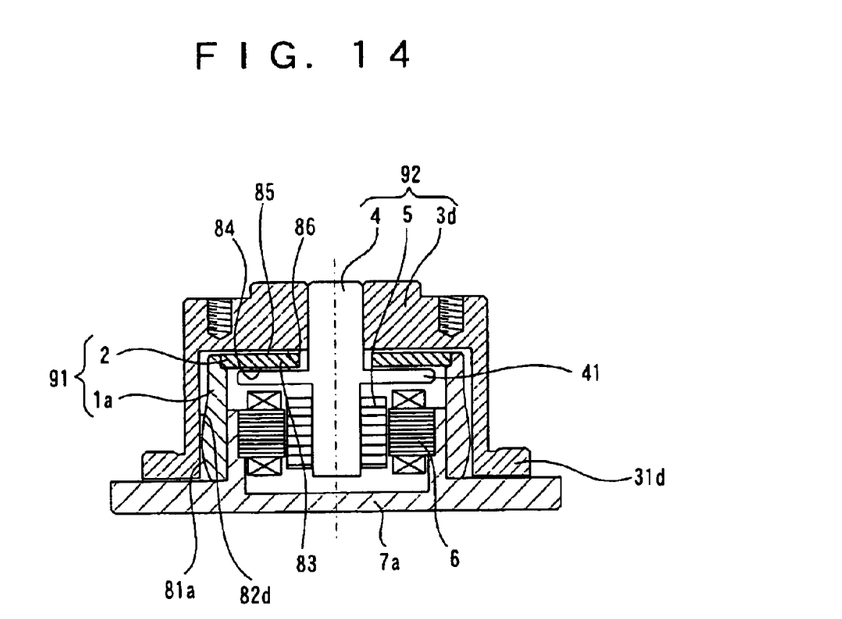
FIG. 14 is a sectional view of a gas dynamic bearing in Embodiment 3 of the present invention.
Figure 15:
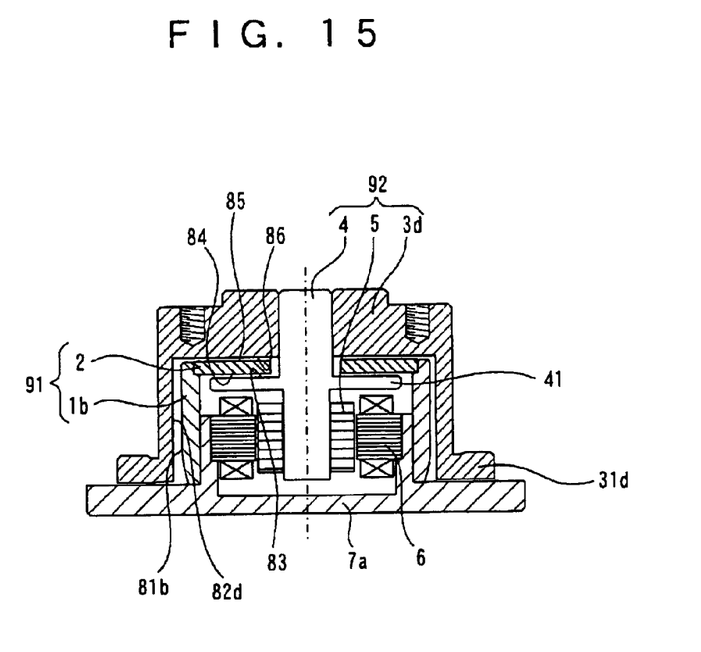
FIG. 15 is a sectional view of another gas dynamic bearing in Embodiment 3 of the present invention.
Figure 16:
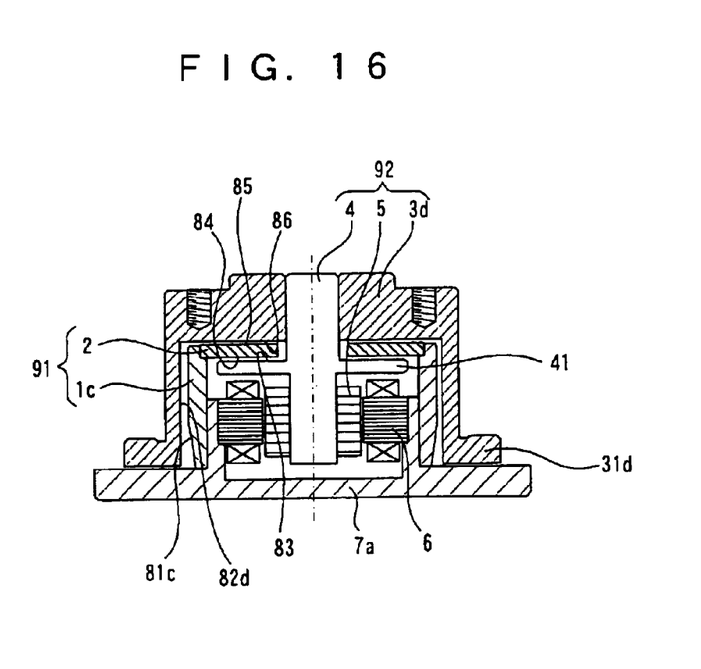
FIG. 16 is a sectional view of still another gas dynamic bearing in Embodiment 3 of the present invention.

In FIGS. 14 to 16, there are shown examples of a third embodiment of the present invention. Note that the same marks are attached to the same constituents of the construction as in the dynamic gas bearing in the above embodiments; therefore, descriptions thereof will not be repeated. Shapes and dimensions therein are almost the same as those in the gas dynamic bearing motor in Embodiment 1.

In a state where a diameter of the inner circumferential surface 82*d* of the hub 3*d* is constant in the axial direction and no recording disk 9 is loaded, diameters of the outer circumferential surface 81*a* of the shaft 1*a* assume a shape in which a value, as shown in FIG. 14, gradually changes so that the value takes the maximum value in the middle in the axial direction thereof and the minimum value at the lower end portion thereof. In addition, as shown in FIG. 15, a diameter of the outer circumferential surface 81*b* of the shaft 1*b* is constant over the upper half from the middle in the axial direction, while diameters thereof assume a curved shape so that a diameter decreases gradually toward the lower end from the middle in the axial direction. Alternatively, as shown in FIG. 16, diameters of the outer circumferential surface 81*c* of the shaft 1*c* assume a tapered shape so that a value decreases toward the lower end from the middle in the axial direction thereof. With shapes as shown in FIGS. 14 to 16 adopted, the same action as in Embodiment 2 can be obtained and, even in a case where a thickness of the hub 3*d* is thin to thereby deform the inner circumferential surface 82*d* of the hub 3*d* to a great extent when the recording disks 9 are loaded, it is possible, in a case where the recording disks 9 are loaded, to confine a difference between the maximum value and minimum value of a clearance between the outer circumferential surface 81*a*, 81*b* or 81*c* of the shaft 1*a*, 1*b* or 1*c* and the inner circumferential surface 82*d* of the hub 3*d* is equal to or less than one half of the clearance, thereby enabling partial contact, which has occurred conventionally, in the lower end portion of the hub 3*d* to be suppressed and, in turn, abrasive wear and lock of the bearing to be prevented.

According to a gas dynamic bearing motor of the present invention, as described above, even in a case where a diameter of a radial bearing is set to a large value to thereby thin a thickness of a hub in order to obtain a sufficient radial bearing stiffness, it is possible to restrict deformation of the hub when recording disks are loaded on the hub to a small value by an annular groove provided on the lower end surface of the hub, thereby enabling suppression of partial contact that is caused by inward deformation of the lower end portion of the inner circumferential surface of the hub, which has occurred conventionally, in the lower end portion of the bearing and, in turn, prevention of abrasive wear and lock of the bearing.

With a change in diameter of the inner circumferential surface of a hub, in the axial direction thereof, or with a change in a diameter of the outer circumferential surface of a shaft, in the axial direction thereof, a clearance between the outer circumferential surface of the shaft and the inner circumferential surface of the hub can be almost constant when recording disks are loaded on the hub, thereby enabling partial contact, which has occurred conventionally, in the lower end portion of the hub to be suppressed and, in turn, abrasive wear and lock of the bearing to be prevented.

Furthermore, an annular protrusion is provided on a base and fitted in an annular groove with a predetermined clearance interposed therebetween to thereby construct a labyrinth seal, thereby enabling prevention of scattering of wear powder generated by friction between bearing surfaces outside a motor through a clearance between the base and the lower end surface of the hub.

What is claimed is:

1. A gas dynamic bearing motor comprising:
   a stationary shaft having a cylindrical surface; and
   a rotor assembly having a cylindrical portion facing the stationary shaft with a predetermined clearance interposed therebetween in a radial direction of the stationary shaft and freely rotatably fitted with the stationary shaft;
   a radial bearing comprising at least one of an outer circumferential surface of said stationary shaft and an inner circumferential surface of said rotor assembly having a pressure generating groove located therein;
   a flange-shaped disk receiving portion extending outwardly in a radial direction and located at a first end of said rotor assembly, a predetermined number of recording disks loaded on the disk receiving portion, a clamp fixed to said rotor assembly to squeeze the recording disks between the disk receiving portion and the clamp with a predetermined force for fixation of the recording; and
   a driving motor for rotating said rotor assembly and holding said rotor assembly and recording disks in a non-contact manner with said stationary shaft, with the action of a dynamic pressure of a gas residing in a clearance between said stationary shaft and said rotor assembly, wherein
   an outer diameter of said stationary shaft is constant in an axial direction thereof, while a diameter of the inner circumferential surface of said rotor assembly changes in an axial direction thereof when no recording disk is loaded on the disk receiving portion so that a clearance between the outer circumferential surface of said stationary shaft and the inner circumferential surface of said rotor assembly is substantially constant in the axial directions thereof when the recording disks are loaded on the disk receiving portion.

2. The gas dynamic bearing motor according to claim 1, wherein the diameter of the inner circumferential surface of said rotor assembly has a minimum value in the substantial middle in the axial direction thereof and changes smoothly in the axial direction thereof to take a maximum value at the first end on the disk receiving portion side.

3. The gas dynamic bearing motor according to claim 1, wherein the diameter of the inner circumferential surface of said rotor assembly has a curved shape gradually increasing toward the end on the disk receiving portion side from the substantial middle in the axial direction thereof.

4. The gas dynamic bearing motor according to claim 1, wherein the diameter of the inner circumferential surface of said rotor assembly has a tapered shape increasing toward the end on the disk receiving portion side from the substantial middle in the axial direction thereof.

5. The gas dynamic bearing motor according to claim 1, wherein a difference between a maximum value and a minimum value of a clearance between the outer circumferential surface of said stationary shaft and the inner circumferential surface of said rotor assembly is not greater than one half of the clearance when the recording disks are loaded on the disk receiving portion.

6. The gas dynamic bearing motor according to claim 1, further comprising the annular groove according to claim 1.

7. The gas dynamic bearing motor according to claim 1, wherein a difference in radius between the inner and outer circumferential surfaces of said rotor assembly is not greater than 3 mm.

8. A gas dynamic bearing motor, comprising:

a stationary shaft having a cylindrical surface; and a rotor assembly having a cylindrical portion facing the stationary shaft with a predetermined clearance interposed therebetween in a radial direction of the stationary shaft and freely rotatably fitted with the stationary shaft;

a radial being comprising at least one of an outer circumferential surface of said stationary shaft and an inner circumferential surface of said rotor assembly having a pressure generating groove located therein, a flange-shaped disk receiving portion extending outwardly in a radial direction and located at a first end of said rotor assembly, a predetermined number of recording disks loaded on the disk receiving portion, a clamp fixed to said rotor assembly to squeeze the recording disks between the disk receiving portion and the clamp with a predetermined force for fixation of the recording disks; and a driving motor for rotating said rotor assembly and holding said rotor assembly and the recording disks in a non-contact manner with said stationary shaft, with the action of a dynamic pressure of a gas residing in a clearance between said stationary shaft and said rotor assembly, wherein an inner diameter of said rotor assembly is constant in the axial direction thereof, while a diameter of the outer circumferential surface of said stationary shaft changes in the axial direction thereof so that a clearance between the outer circumferential surface of said stationary shaft and the inner circumferential surface of said rotor assembly is substantially constant in the axial directions thereof when the recording disks are loaded on the disk receiving portion.

9. The gas dynamic bearing motor according to claim 8, wherein the diameter of the outer circumferential surface of said stationary shaft has a shape gradually changing so that a diameter has a maximum value in the substantial middle in the axial direction thereof and a minimum value at the end on the disk receiving portion side.

10. The gas dynamic bearing motor according to claim 8, wherein the diameter of the outer circumferential surface of said stationary shaft has a curved shape so that a diameter decreases gradually toward the end on the disk receiving portion side from the substantial middle in the axial direction.

11. The gas dynamic bearing motor according to claim 8, wherein the diameter of the outer circumferential surface of said stationary shaft has a tapered shape so that the diameter decreases toward the end on the disk receiving portion side from the substantial middle in the axial direction thereof.

* * * * *